United States Patent
Eilola

(10) Patent No.: US 10,173,342 B2
(45) Date of Patent: Jan. 8, 2019

(54) ARRANGEMENT AND METHOD FOR CURING CONCRETE PRODUCTS

(71) Applicant: Elematic Oyj, Akaa (FI)

(72) Inventor: Jani Eilola, Lempaala (FI)

(73) Assignee: Elematic Oyj, Akaa (FI)

( * ) Notice: Subject to any disclaimer, the term of this patent is extended or adjusted under 35 U.S.C. 154(b) by 811 days.

(21) Appl. No.: 14/583,913

(22) Filed: Dec. 29, 2014

(65) Prior Publication Data

US 2015/0183128 A1   Jul. 2, 2015

(30) Foreign Application Priority Data

Dec. 31, 2013  (FI) .................................. 20136339

(51) Int. Cl.
| | |
|---|---|
| *F26B 3/00* | (2006.01) |
| *B28B 11/24* | (2006.01) |
| *C04B 40/02* | (2006.01) |
| *F26B 21/08* | (2006.01) |

(52) U.S. Cl.
CPC .......... *B28B 11/245* (2013.01); *B28B 11/247* (2013.01); *C04B 40/024* (2013.01); *F26B 21/08* (2013.01)

(58) Field of Classification Search
CPC ...... B28B 11/247; B28B 11/245; F26B 21/08; F26B 21/145
USPC ............................ 34/474, 475, 466, 477, 557
See application file for complete search history.

(56) References Cited

U.S. PATENT DOCUMENTS

| | | | |
|---|---|---|---|
| 2,502,940 A | 4/1950 | Gelbman | |
| 4,772,439 A * | 9/1988 | Trevino-Gonzalez | ....................... B28B 11/245 264/333 |
| 5,187,882 A * | 2/1993 | Leach | ................... B28B 11/245 264/333 |

FOREIGN PATENT DOCUMENTS

| | | |
|---|---|---|
| CN | 201493944 U | 6/2010 |
| CN | 101767370 A | 7/2010 |
| CN | 102366967 | 3/2012 |
| DE | 10042627 | 3/2002 |
| DE | 102005037881 A1 | 2/2007 |
| EP | 1681150 A1 | 7/2006 |
| GB | 1292286 A | 10/1972 |
| JP | 2011068502 A | 4/2011 |

(Continued)

OTHER PUBLICATIONS

Search Report issued on corresponding Finnish Pat. App. No. 20136339.

(Continued)

*Primary Examiner* — John McCormack
(74) *Attorney, Agent, or Firm* — Berggren LLP

(57) ABSTRACT

An arrangement for curing concrete products, which contains a curing chamber having several curing cells arranged in at least one column, in which curing cells are located on a vertical stack. The curing cells are formed to curing cell groups, in which one curing cell group contains at least one curing cell, advantageously 2-4 curing cells, and wherein the curing cell group is insulated in respect of other curing cell groups of the curing chamber. A method for curing concrete products in a curing chamber, which includes several curing cells arranged in at least one column, in which the curing cells are located on a vertical stack. In the method the moisture level of curing cells is controlled such that in the curing cells the temperature is desired.

10 Claims, 2 Drawing Sheets

(56) References Cited

FOREIGN PATENT DOCUMENTS

KR   100941973        2/2010
WO    9218306 A1     10/1992

OTHER PUBLICATIONS

Search Report issued on corresponding European Application No. 14197116.8 dated Oct. 14, 2015.
Third Party Observation from Ione S.r.l., Ferrara, Italy, including an article from CPI—Concrete Plant International, Issue 5, Oct. 2002, Cover, p. 40 and pp. 220-244.
Third Party Observation from CureTec Enegietechnik GmbH & Co. KG including brochure, Concrete Curing Solutions (7 pages).
CN Search report dated Jul. 4, 2017.

* cited by examiner

ARRANGEMENT AND METHOD FOR CURING CONCRETE PRODUCTS

This application claims benefit of Finnish Patent Application No. 20136339, filed 31 Dec. 2013.

BACKGROUND

1. Field

The present disclosure relates to casting of prefabricated concrete products in a casting production process. More precisely the present disclosure relates to an arrangement for curing concrete products and to a method for curing concrete products.

2. Description of Related Art

In casting production processes, the casting is performed in different stages at work stations, and different types of lines are used, for example circulating lines such as forced circulation lines and center conveyance lines. In forced circulation lines, mold tables and molds built on them are transferred by a roll trestle in a successive order from one work station, in which a process stage is performed, to a next work station, in which the next process stage is performed, and thus the process stage taking the longest time defines the speed of the forced circulation line. In circulating lines, mold tables, on which casting molds are built, are mounted on tracks and circulate through the work stations for the stages of the production process.

The casting lines thus comprise a plurality work stations between which the casting mold table is transferred for the different stages of the production process. The stages of the production process can comprise, for example, cleaning of the mold table, furnishing the mold table with fixed and detachable mold sidewalls to form the casting mold and setting of other required equipment, such as reinforcements etc., on the mold, casting of the concrete mass to the mold, together with required vibrating actions during the casting, leveling the upper surface of the product to be cast, curing the fresh cast product, demolding, in which the cast product is removed from the mold, generally together with tilting of the mold and removing the mold sidewalls from the mold table.

Depending on the type of the production process line, the line may comprise one or more work stations for one type of process stage.

The curing stage generally takes place at a curing chamber where temperature during the curing can be monitored and adjusted such that the surface of the concrete product to be cured remains moist in order to avoid cracks. taking into account that as temperature in the curing chamber increases, the moisture level decreases.

In the curing stage, the molds with cast products are generally located in columns of several molds on top of each other so that the area required by curing the products can be minimized. Further, the curing area is advantageously enclosed so that the heat released for the concrete during the curing process can be used for speeding up the curing process.

Typically, the curing chambers are continuously operating, such that at one end of the curing chamber fresh cast products to be cured are brought in, and at the other end, the cured cast products are taken out and transferred to the next process stage. Typically, the fresh cast product is brought to a free location of a column of the curing chamber, from which the cured cast product has been taken out so that in the curing chamber there are cast products of different curing stages, i.e. at different temperatures, at the same time. This is problematic in view of the known heating systems of the curing chambers as the relative moisture level is not optimal for cast products of different temperatures, and balance between temperature and moisture level is disturbed. A cold cast product that has just entered the curing chamber creates a high condensate level on its surface, but a warm cast product that has already been in the curing chamber for a longer time needs a higher relative moisture level for proper curing. In practice, the cold cast products define the relative moisture level of the curing chamber by condensing moisture from air.

SUMMARY

An object of an embodiment of the present invention is to create an arrangement for curing concrete products, in which the problems relating to different temperatures of cast products in the curing chamber are eliminated or at least minimized.

An object an embodiment of the present invention is to create an arrangement for curing concrete products, in which the problems relating to moisture and condensate level in the curing chamber are eliminated or at least minimized.

In order to achieve the above objects and those that will come apparent later, the arrangement according to an embodiment of the invention comprises a curing chamber comprising several curing cells arranged in at least one column, in which curing cells are located on a vertical stack, which curing cells are formed to curing cell groups, in which one curing cell group comprises at least one curing cell, advantageously 2-4 curing cells, and which curing cell group is insulated in respect of other curing cell groups of the curing chamber, characterized in that the curing cell group comprises moisture and/or temperature measurement means and that the measurement means comprise a sensor to measure surface temperature of the element to be cured in order to define the required condensation point temperature. The method according to an embodiment of the invention in turn comprises several curing cells arranged in at least one column, in which the curing cells are located on a vertical stack, in which method the moisture level of curing cells is controlled such that in the curing cells the temperature is desired, which curing cells are formed to curing cell groups, in which one curing cell group comprises at least one curing cell, advantageously 2-4 curing cells, and that the curing cell group is insulated in respect of other curing cell groups of the curing chamber, characterized in that surface temperature of the element to be cured is measured by a sensor in order to define the required condensation point temperature.

According to an embodiment of the invention, the arrangement for curing concrete products comprises a curing chamber comprising several curing cells and the curing cells are formed into curing cell groups, in which one curing cell group comprises at least one curing cell, advantageously 2-4 curing cells, and the curing cell group is insulated in respect of other curing cell groups of the curing chamber.

According to an advantageous feature, the curing cell group is formed in at least one column by horizontal separating insulation walls limiting the curing cell group in a vertical direction.

According to an advantageous feature, the curing cell is formed by vertical separating insulation walls limiting the curing cell groups in a horizontal direction, such that columns are formed that are insulated from each other.

According to an advantageous feature, the curing cell group has a moisture control means for controlling the moisture level within the insulated curing cell group.

According to an advantageous feature, the curing cell group has a moisture control means for controlling the temperature within the insulated curing cell group.

According to an advantageous feature, the curing cell group comprises moisture nozzles.

According to an advantageous feature, the moisture nozzle comprises means for controlling the flow of moisture.

According to an advantageous feature, the curing cell group comprises moisture and/or temperature measurement means.

According to an advantageous feature, the curing cell groups of the curing chamber are connected to a common air channel system, which comprises heating means for heating the air in the channel system. Advantageously, the air channel system comprises means for circulating air.

In an embodiment of the present invention movable casting mold together with fresh cast concrete products are moved for curing into a curing chamber, where the casting molds with the concrete products are stacked to form columns of a plurality of casting molds in the curing chamber, wherein the columns of casting molds in the curing chamber are formed by lifting the casting molds forming the columns from the lowest casting mold of the column, and inserting a new casting mold below the previous casting mold.

According to an advantageous feature of an embodiment of the invention, the moisture level of each curing cell is controlled, such that in each curing cell the temperature and the moisture level are desirably, advantageously substantially same in each curing cell.

According to an advantageous feature of an embodiment of the invention, the moisture level of each curing cell is controlled such that warmed cast products to be cured are kept at such a moisture level that cracks do not occur, and cold cast products to be cured are not moisturized to a moisture content over the required condensation level.

According to an advantageous feature of an embodiment of the invention, the moisture level of each of the curing cells of the curing chamber is controlled by moisture control means, such that the condensation point temperature is kept little higher or lower than the surface temperature of the concrete products located in the curing cells or at the condensation point, depending on the desired product quality.

According to an advantageous feature of an embodiment of the invention, relative moisture level is increased as the temperature of the element to be cured increases.

According to an advantageous feature of an embodiment of the invention, moisture level and/or temperature of each curing cell group is measured and the moisture level is controlled based on the measurement result, such that the required moisture level is reached.

According to an advantageous feature of an embodiment of the invention, moisture level and/or temperature of each curing cell group is measured and the moisture level is controlled based on the measurement result, such that the required temperature is reached.

According to a feature of an embodiment of the invention, the temperature of the curing chamber is kept at 50° C., and close to the surface of the cast product to be cured the moisture level is at 85-95% and the condensation point is 18° C.

The embodiments of the invention are utilizable for different types of production process line, and advanta-geously the arrangement and the method for curing cast products is used in the curing stage of a circulating line.

BRIEF DESCRIPTION OF DRAWINGS

In the following the invention and its advantages are explained in greater detail below in the sense of examples and with reference to accompanying drawings, where.

DETAILED DESCRIPTION OF SPECIFIC EMBODIMENTS

In the figures, the corresponding elements, parts and part components of the arrangement are denoted by same reference signs unless otherwise mentioned. For clarity reasons, the reference signs are typically marked in the figure in respect of one component/part/part component.

Figure 1:
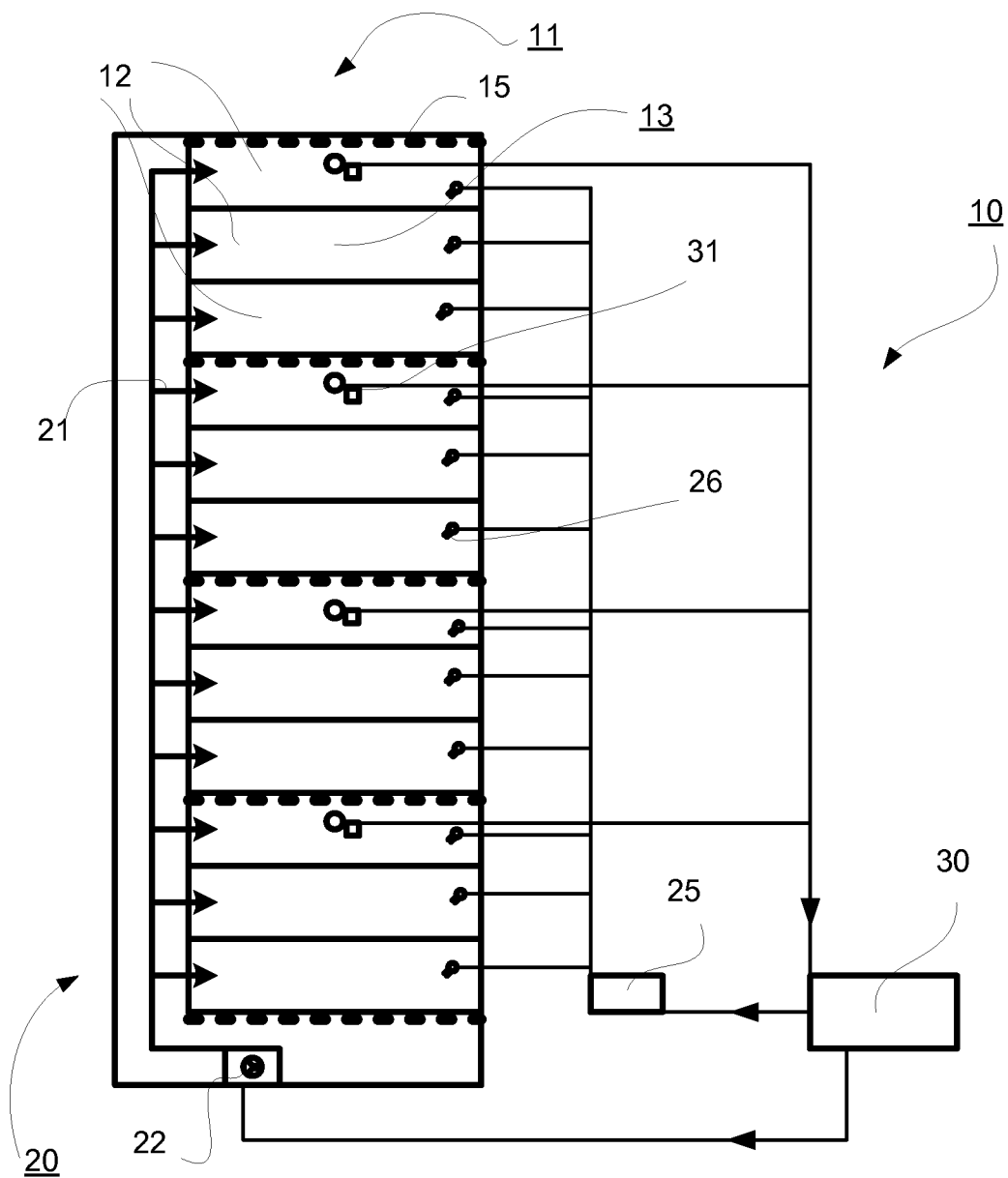
in FIG. 1 is schematically shown an example of a curing chamber according to an advantageous example of the invention; and in FIG. 2 is schematically shown another example of a curing chamber according to an advantageous example of the invention.

In the example of FIG. 1, the curing chamber 10 comprises one column 11 with several curing cells 12. In this example, three curing cells 12 are insulated by horizontal insulation walls 15 to form a curing cell group 13. The air channel system 20 comprises air channels 21 to each of the curing cells and air heating and circulating means (air heater and circulator) 22 to provide the circulation of the heated air in the air channel system 20. The air channel system 20 may comprise return channels from the curing cells for heat recovery. Each curing cell 12 also comprises a nozzle 26 for providing moisture from the moisture system 25 to curing cells 12. Each curing cell group 13 comprises temperature and/or moisture measurement means (temperature and/or moisture measurer) 31 for measuring the temperature and/or moisture level of the curing cell group 13. The measurement data of the temperature and/or moisture measurement means 31 is transmitted to a control system 30, which controls the moisture system 25 such, that moisture level and temperature in each curing cell group 13 are at desired values. In particular, surface temperature of the element to be cured is measured by a sensor of the measurement means, for example by an infra-red sensor, in order to define the required condensation point temperature.

Also surface moisture of the element to be cured can be measured by another sensor of the measurement means, for example by a micro-wave sensor.

Figure 2:
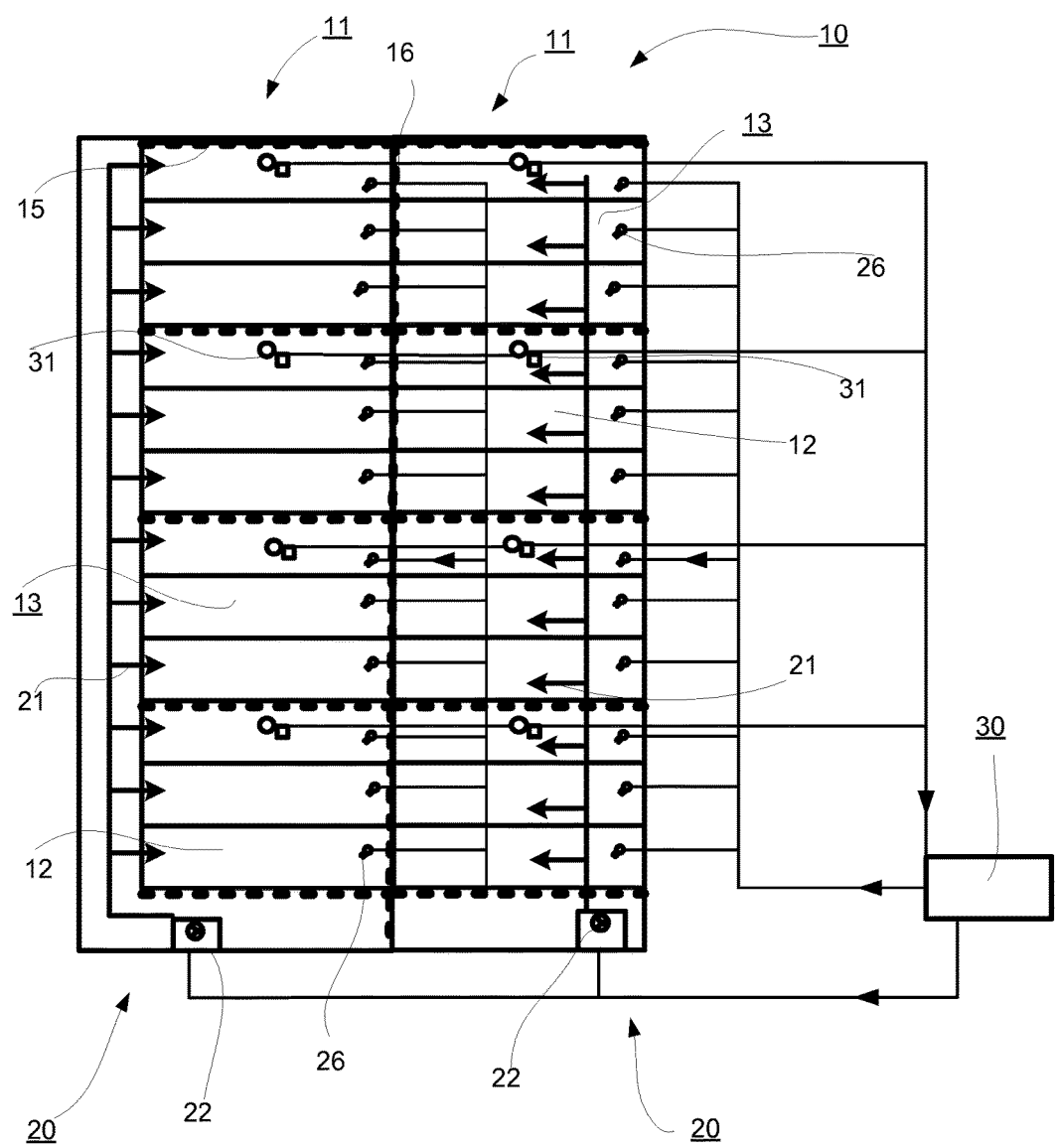

In the example of FIG. 2, the curing chamber 10 comprises two columns 11 with several curing cells 12. In this example, three curing cells 12 are insulated by horizontal insulation walls 15 to form a curing cell group 13, which is insulated from the curing cell group of the next column 11 by vertical insulation wall 16. The air channel system 20 comprises air channels 21 to each of the curing cells and air heating and circulating means (air heater and circulator) 22 to provide the circulation of the heated air in the air channel system 20. The air channel system 20 may comprise return channels from the curing cells for heat recovery. Each curing cell 12 also comprises a nozzle 26 for providing moisture from the moisture system 25 to curing cells 12. Each curing cell group 13 comprises temperature and/or moisture measurement means (temperature and moisture measurer) 31 for measuring the temperature and/or moisture level of the curing cell group 13. The measurement data of the temperature and/or moisture measurement means 31 is transmitted to a control system 30, which controls the moisture system 25, such that moisture level and temperature in each curing cell group 13 are at desired values.

In the curing chamber, molds with cast products are located in columns 11 of several curing cells 12 on top of each other so that the area required by curing the products can be minimized. The curing chamber 10 is enclosed, so that heating and moisturizing effect is focused inside the curing chamber 10 and also the heat released for the concrete during the curing process can be used for speeding up the curing process. Advantageously, the curing chamber 10 is continuously operating such that at one end of the curing chamber 10 fresh cast products to be cured are brought in, and at the other end, the cured cast products are taken out and transferred to the next process stage. In this example, the fresh cast product is brought to a free curing cell, 12 of the column, 11, from which the cured cast product has been taken out. Thus the casting molds, together with fresh cast concrete products, are moved for curing into the curing chamber 10, where the casting molds with the concrete products are stacked to form columns 11 of a plurality of casting molds in the curing chamber 10, wherein the columns 11 of casting molds in the curing chamber are formed by lifting the casting molds forming the columns 11 from the lowest casting curing cell of the column 11, inserting a new casting mold below the previous casting mold.

The arrangement for curing concrete products comprises a curing chamber 10 comprising several curing cells 12 and the curing cells 12 are formed as curing cell groups 13, in which one curing cell group 13 comprises at least one curing cell 12, in the examples of FIGS. 1-2 three curing cells 12, and the curing cell groups 13 are insulated in respect of other curing cell groups 13 of the curing chamber. The curing cells 12 are formed in columns 11 of molds by horizontal separating insulation walls 15 limiting the curing cell group 13 in vertical direction and by vertical separating insulation walls 16 limiting the curing cell groups 13 in horizontal direction. The curing cell groups 13 of the curing chamber 10 are connected to common air channel system 20.

The invention claimed is:

1. An arrangement for curing concrete products, which comprises:
   a curing chamber, comprising several curing cells arranged in at least one column, wherein the curing cells are located on a vertical stack, and formed into curing cell groups, wherein one curing cell group comprises:
   at least one curing cell,
   a moisture measurement device and a temperature sensor to measure respectively a moisture level and a temperature in the at least one curing cell/one curing cell group,
   at least one temperature measurement device comprising at least one sensor to measure a surface temperature of at least one concrete product to be cured in the at least one curing cell, and
   a moisture controlling device for controlling the moisture level within the at least one curing cell, such that a condensation point temperature is kept slightly higher or slightly lower than the surface temperature of the at least one concrete product located in the at least one curing cell, or at the surface temperature depending on a desired product quality, the controlling is automatically provided using the measured moisture level and temperature, and the at least one measured surface temperature of the at least one concrete product, and wherein the one curing cell group is insulated with respect to other curing cell groups in the curing chamber.

2. The arrangement according to claim 1, wherein the curing cell group is formed in at least one column by horizontal separating insulating walls limiting the curing cell group in a vertical direction.

3. The arrangement according to claim 1, wherein the curing cell group is formed by vertical separating insulation walls limiting the curing cell groups in a horizontal direction.

4. The arrangement according to claim 1, wherein the curing cell group has moisture control means for controlling the temperature within the curing cell group.

5. The arrangement according to claim 1, wherein the curing cell group comprises moisture nozzles and wherein the moisture nozzles control flow of moisture.

6. The arrangement according to claim 1, wherein the curing cell groups of the curing chamber are connected to a common air channel system, which comprises air channels to curing cells and a heater for heating the air in the common air channel system.

7. The arrangement according to claim 6, wherein the common air channel system comprises an air circulator.

8. A method for curing concrete products in a curing chamber, which comprises several curing cells arranged in at least one column, wherein the curing cells are located on a vertical stack, which curing cells are formed into curing cell groups wherein one curing cell group comprises:
   at least one curing cell,
   a moisture measurement device and a temperature sensor,
   at least one temperature measurement device comprising at least one sensor, and
   a moisture controlling device for controlling moisture within the curing cell group,
   wherein the curing cell group is insulated with respect to other curing cell groups in the curing chamber,
   wherein the method comprises the steps of:
   measuring a surface temperature of at least one concrete product in the at least one curing cell with the at least one temperature measurement device,
   measuring a moisture level and a temperature in of the at least one curing cell/one curing cell group with the moisture measurement device and the temperature sensor, and
   controlling the moisture level within the at least one curing cell with the moisture controlling device such that a condensation point temperature is kept slightly higher or slightly lower than the surface temperature of the at least one concrete product located in the at least one curing cell, or at the surface temperature depending on a desired product quality, the controlling is automatically provided using the measured moisture level and temperature, and the surface temperature of the at least one concrete product in the at least one curing cell, that a condensation point temperature is kept little higher or lower than the surface temperature of the at least one concrete product located in the at least one curing cell, or at the condensation point temperature depending on a desired product quality.

9. The method according to claim 8, comprising increasing a corresponding relative moisture level as the surface temperature of a concrete product to be cured increases.

10. The method according to claim 8, comprising measuring corresponding moisture level and temperature of each curing cell group and controlling the moisture level based on the measurement result, such that a desired moisture level and temperature is reached for the corresponding surface temperature of a concrete product in the each curing cell group.

* * * * *